United States Patent
Lee et al.

(10) Patent No.: US 7,317,436 B2
(45) Date of Patent: Jan. 8, 2008

(54) LIQUID CRYSTAL DISPLAY DEVICE AND METHOD OF FABRICATING THE SAME

(75) Inventors: Dong Hoon Lee, Kyongsangbuk-do (KR); Young Sik Kim, Kyongsangbuk-do (KR); Su Hwan Moon, Kyongsangbuk-do (KR); Sun Yong Lee, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 661 days.

(21) Appl. No.: 10/865,906

(22) Filed: Jun. 14, 2004

(65) Prior Publication Data

US 2005/0093812 A1   May 5, 2005

(30) Foreign Application Priority Data

Oct. 29, 2003  (KR)  .................. 10-2003-0076018

(51) Int. Cl.
  *G09G 3/36*  (2006.01)
(52) U.S. Cl. ........................ 345/87; 345/101
(58) Field of Classification Search .............. 345/87, 345/98, 101; 349/21–22, 161, 43; 428/1.3; 438/153–154, 163, 166; 257/E21.413
See application file for complete search history.

(56) References Cited

U.S. PATENT DOCUMENTS

| | | | |
|---|---|---|---|
| 6,414,740 B1 | 7/2002 | Hosoyamada | |
| 6,483,567 B1 * | 11/2002 | Okada | 349/158 |
| 6,806,871 B1 * | 10/2004 | Yasue | 345/211 |
| 7,005,670 B2 * | 2/2006 | Kim et al. | 257/25 |
| 7,095,393 B2 * | 8/2006 | Lee | 345/89 |
| 7,106,287 B2 * | 9/2006 | Ham | 345/89 |
| 7,193,663 B2 * | 3/2007 | Shimizu et al. | 349/38 |
| 7,215,311 B2 * | 5/2007 | Kim | 345/98 |

FOREIGN PATENT DOCUMENTS

KR   1995-0012104   5/1995

* cited by examiner

*Primary Examiner*—Amare Mengistu
*Assistant Examiner*—Abbas Abdulselam
(74) *Attorney, Agent, or Firm*—Morgan, Lewis & Bockius LLP (57) ABSTRACT

A liquid crystal display device includes a liquid crystal display panel having an effective area and a non-display area, and a temperature sense pattern provided within the non-display area of the liquid crystal display panel.

20 Claims, 8 Drawing Sheets

LIQUID CRYSTAL DISPLAY DEVICE AND METHOD OF FABRICATING THE SAME

The present invention claims the benefit of Korean Patent Application No. P2003-76018 filed in Korea on Oct. 29, 2003, which is hereby incorporated by reference.

BACKGROUND OF THE INVENTION

1. Field of the Invention

The present invention relates to a liquid crystal display (LCD) device and a method of fabricating an LCD device, and more particularly, to an LCD device having a temperature measurement device and a method of fabricating an LCD device having a temperature measurement device.

2. Discussion of the Related Art

As demand for information increases, significant effort has been made to develop various types of flat display devices, such as liquid crystal display (LCD) devices, plasma display panel (PDP) devices, electroluminescent display (ELD) devices, and vacuum fluorescent display (VFD) devices. Among the various types of flat display devices, LCD devices have been commonly used to replace cathode ray tube (CRT) devices due to the LCD device's thin profile, light weight, and low power consumption. In addition to mobile-type LCD devices, such as displays for notebook computers, LCD devices have been developed for use as computer monitors and televisions.

Despite various technical developments within the LCD technology field, image quality enhancement of the LCD devices has been lacking in comparison to other features and advantages of the LCD devices. In order to use LCD devices as general display devices, the LCD devices must be able to produce high quality images, such as high resolution and luminance, with large-sized screens, while still maintaining their light weight, thin profile, and low power consumption.

In general, an LCD device includes an LCD panel for displaying images, and a driving part for supplying driving signals to the LCD panel. The LCD panel includes first and second glass substrates bonded to each other having a predetermined interval therebetween, wherein a liquid crystal material is injected between the first and second glass substrates. The first glass substrate (i.e, TFT array substrate) includes a plurality of gate and data lines, a plurality of pixel electrodes, and a plurality of thin film transistors (TFTs). The plurality of gate lines are formed on the first glass substrate at fixed intervals, and the plurality of data lines are formed perpendicular to the plurality of gate lines at fixed intervals. Then, the plurality of pixel electrodes are arranged in a matrix-type configuration and are each formed within pixel regions defined by crossings of the plurality of gate and data lines. The plurality of TFTs are switched ON/OFF according to signals transmitted along the gate lines in order to convey signals transmitted along the data lines to the pixel electrodes. The second glass substrate (i.e., color filter substrate) includes a black matrix layer that excludes light from regions except for the pixel regions of the first substrate, R/G/B color filter layers for producing colored light, and a common electrode to produce images in combination with the pixel electrode.

The LCD device is driven according to optical anisotropy and polarizability of liquid crystal molecules in the liquid crystal material, wherein the liquid crystal molecules are aligned by their long and thin shapes. Accordingly, an induced electric field is supplied to the liquid crystal material for controlling alignment directions of the liquid crystal molecules. For example, if the alignment direction of the liquid crystal molecules is controlled by the induced electric field, light is polarized and changed due to the optical anisotropy of the liquid crystal material, thereby displaying images. Presently, Active-Matrix type LCD devices are being developed that include arrangements of TFTs and pixel electrodes connected thereto in a matrix-configuration to provide high resolution and improved image quality.

Figure 1:
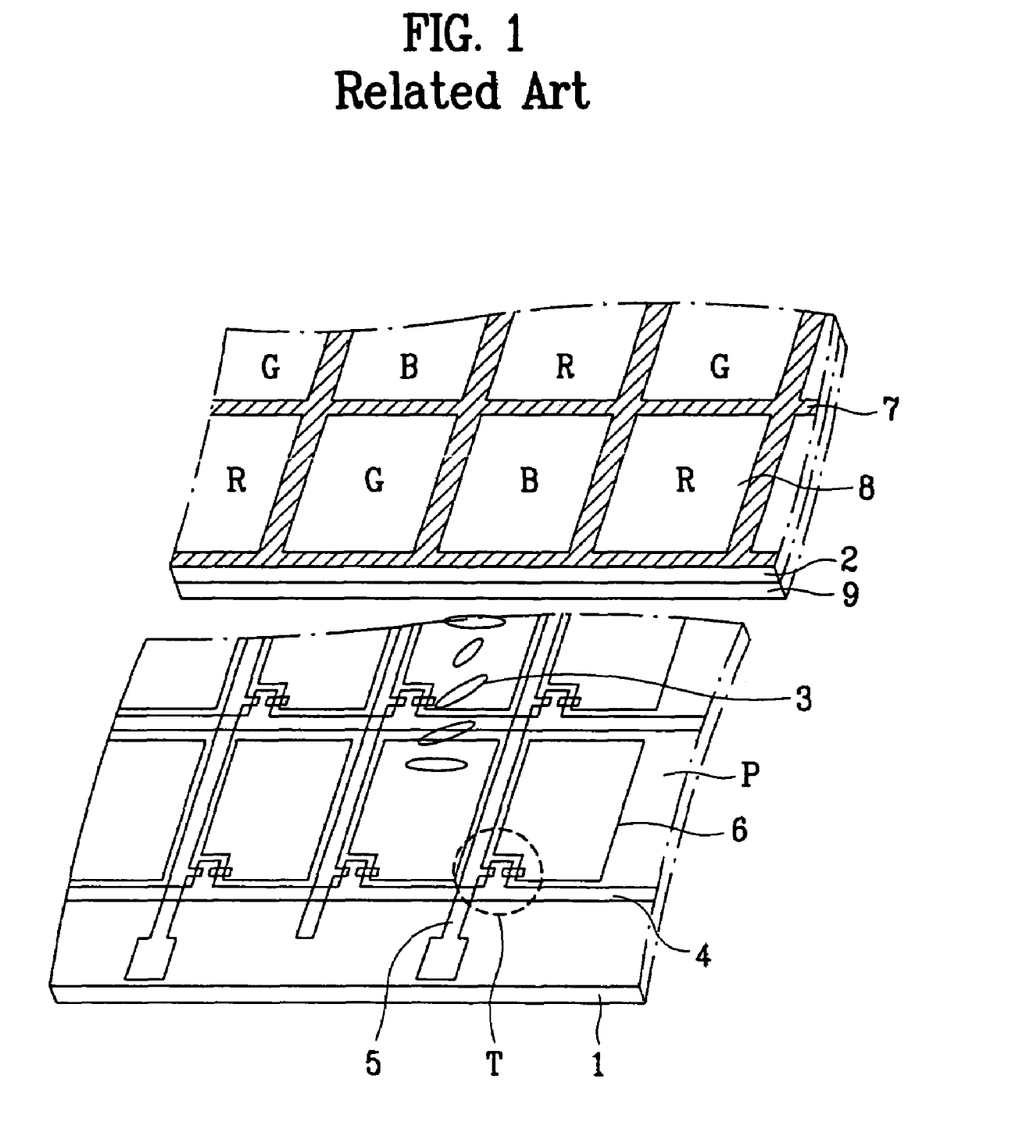
FIG. 1 is a perspective view of an LCD device according to the related art.

FIG. 1 is a perspective view of an LCD device according to the related art. In FIG. 1, an LCD device includes lower and upper substrates 1 and 2, and a liquid crystal layer 3 formed by injecting liquid crystal material between the lower and upper substrates 1 and 2. The lower substrate 1 includes a plurality of gate lines 4 disposed along one direction at fixed intervals, a plurality of data lines 5 perpendicular to the gate lines 4 to define pixel regions P, pixel electrodes 6 in the pixel regions P defined by crossing the gate and data lines 4 and 5, and TFTs T at respective crossing portions of the gate and data lines 4 and 5. The upper substrate 2 includes a black matrix layer 7 for preventing light leakage on portions except the pixel regions P, RlG/B color filter layers 8 for producing colored light, and a common electrode 9 for producing images in combination with the pixel electrode 6.

Although not shown, the TFT T includes a gate electrode protruding from the gate line 4, a gate insulating layer formed along an entire surface of the substrate, an active layer on the gate insulating layer above the gate electrode, a source electrode protruding from the data line 5, and a drain electrode being opposite to the source electrode. The pixel electrode 6 is formed of transparent conductive metal having high light transmittance, such as indium-tin-oxide (ITO). In the LCD device, liquid crystal molecules of the liquid crystal layer 3 positioned on the pixel electrode 6 are aligned by signals supplied via the TFT T, whereby images are displayed by controlling light transmittance due to the alignment of the liquid crystal molecules of the liquid crystal layer 3.

Figure 2:
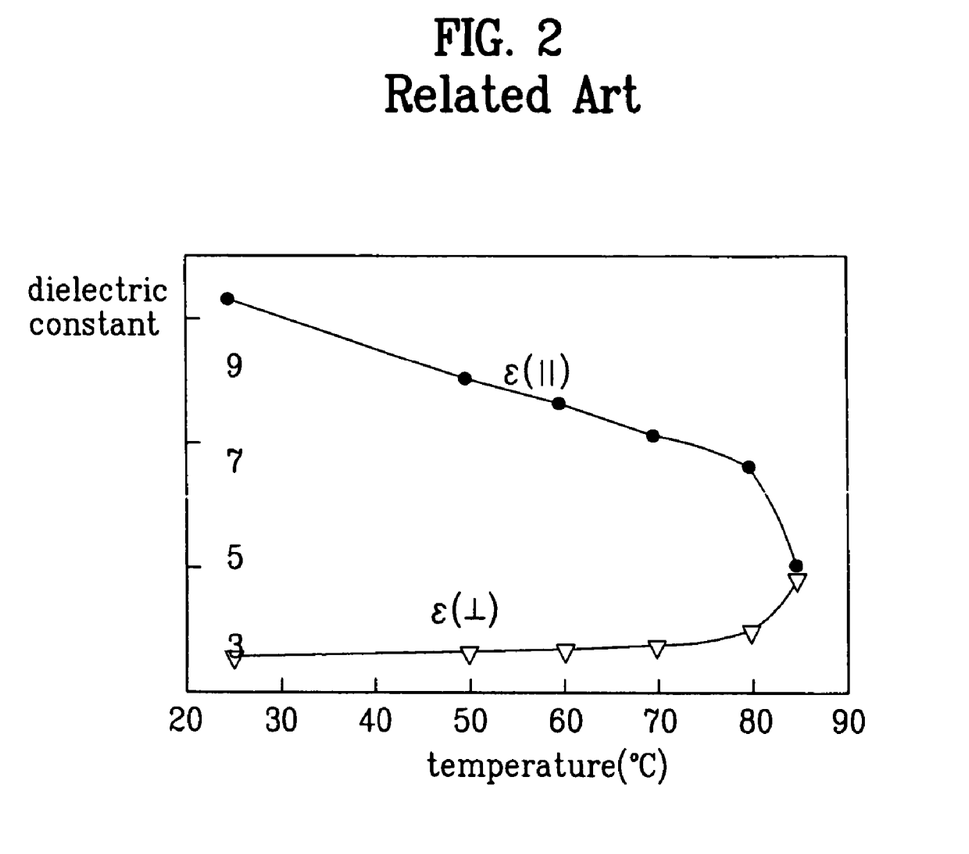
FIG. 2 is a graph showing a relationship between temperature and dielectric constant of liquid crystal material according to the related art.

FIG. 2 is a graph showing a relationship between temperature and dielectric constant of liquid crystal material according to the related art. In FIG. 2, as temperature increases, dielectric constant $\in(\perp)$ of the liquid crystal molecules along the short axis (minor axis) increases, and dielectric constant $\in(//)$ of the liquid crystal molecules along the long axis (major axis) decreases, thereby increasing dielectric anisotropy. In addition, as the temperature increases, modulus of elasticity of the liquid crystal material decreases. Accordingly, the decrease in the modulus of elasticity and the dielectric anisotropy of the liquid crystal material results in difficulties in aligning the liquid crystal molecules along predetermined directions during application of voltages when the temperature of the LCD panel is high.

In FIG. 2, the dielectric constant of the liquid crystal material is at a normal temperature of 20° C., or more. Although not shown, if the temperature of the LCD panel is reduced to below 0° C., some of the liquid crystal material within the LCD panel is changed into a crystalline state, thereby deteriorating fluidity of the liquid crystal material. Accordingly, when applying the voltages, it is difficult to obtain an alignment state of the liquid crystal molecules along a desired direction. For example, when the liquid crystal material of the LCD panel is maintained at relatively high or low temperatures, control of the alignment of the liquid crystal molecules becomes difficult before and after application of the voltage. Thus, measuring and compensating for operational temperatures of the LCD panel must be performed.

Generally, the LCD device displays images by using the liquid crystal material having an intermediate state somewhere between the fluid state and the solid state. For example, the LCD device displays the images due to maintaining the liquid crystal material in the fluid state by using the optical anisotropy of the liquid crystal material. Accordingly, the light transmittance of the liquid crystal material is changed according to the operation temperature of the LCD device, wherein the liquid crystal material has the highest light transmittance at a temperature of about 20° C.

Figure 3:
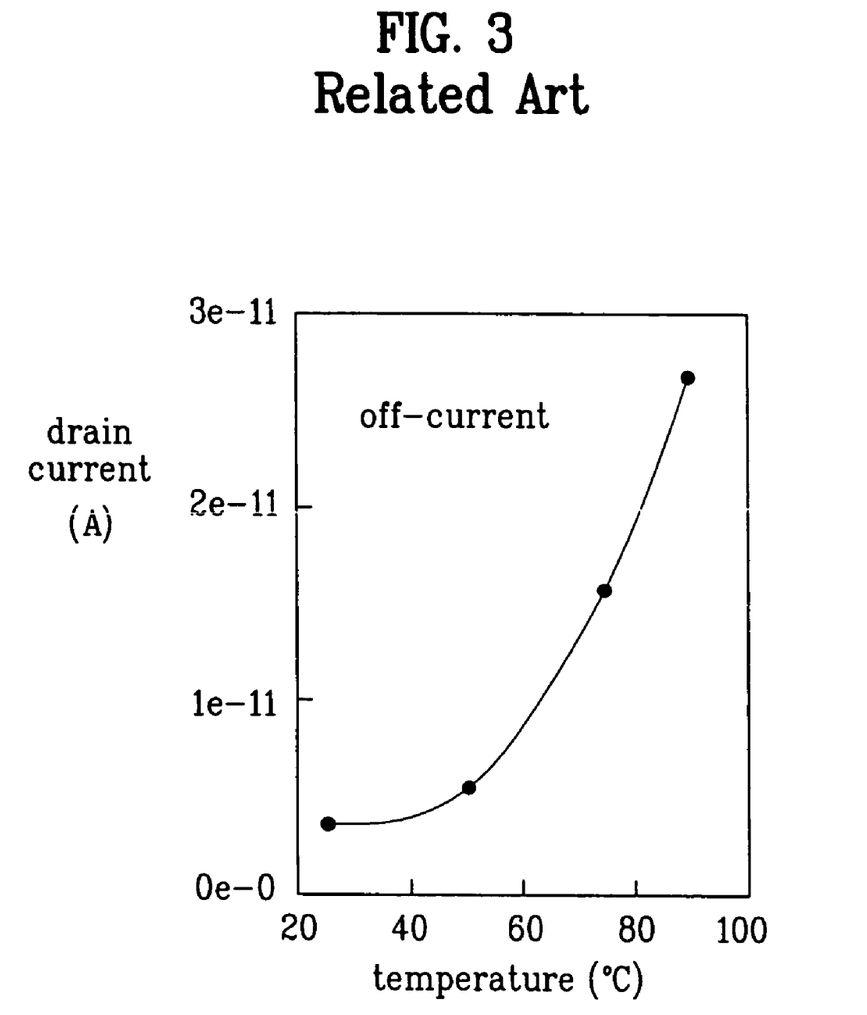
FIG. 3 is a graph showing a relationship between temperature and drain current when turning OFF a TFT according to the related art.
Figure 4:
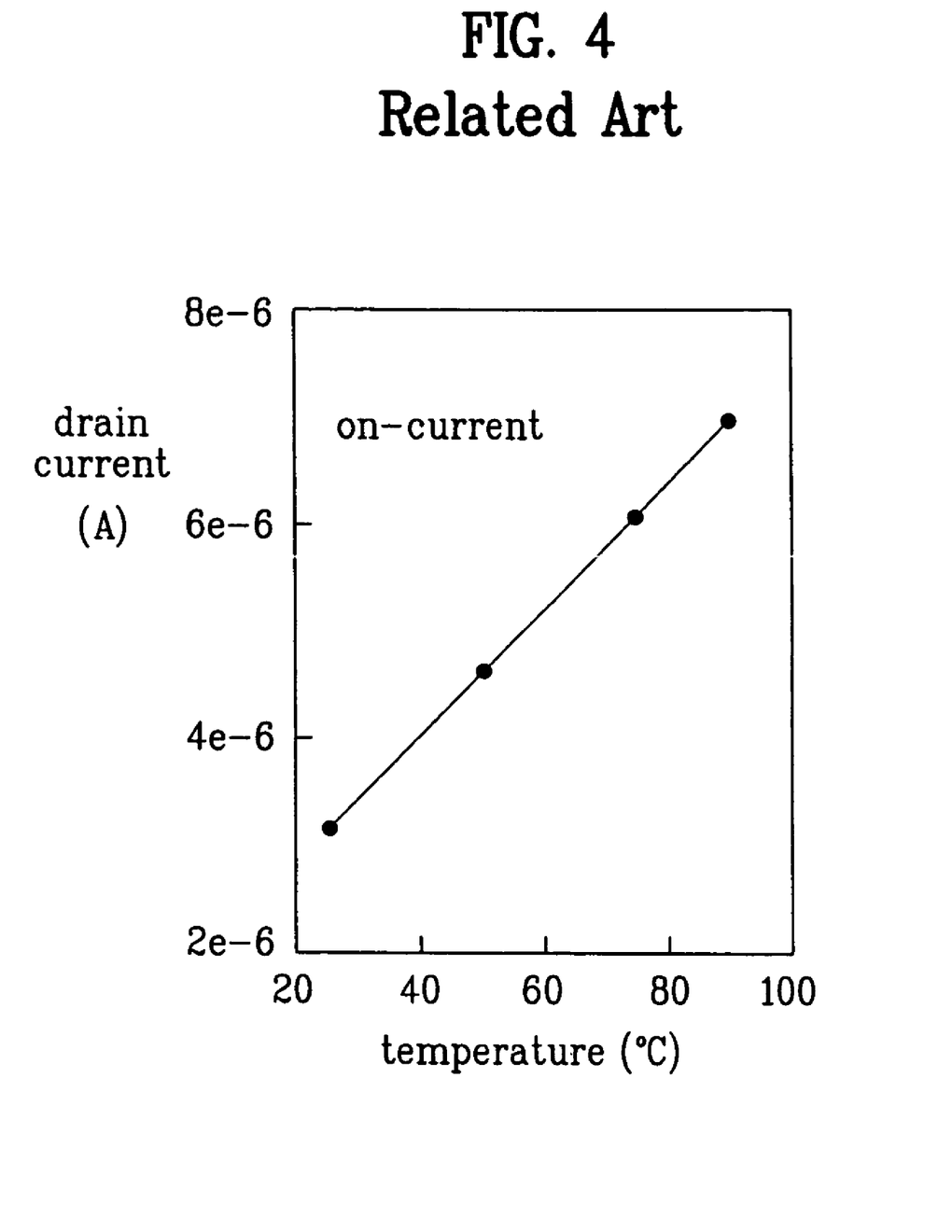
FIG. 4 is a graph showing a relationship between temperature and drain current when turning ON a TFT according to the related art.

FIG. 3 is a graph showing a relationship between temperature and drain current when turning OFF a TFT according to the related art, and FIG. 4 is a graph showing a relationship between temperature and drain current when turning ON a TFT according to the related art. In FIG. 3, during the turn OFF state of the TFT, wherein the TFT supplies a constant gate voltage (−10V) to a gate, a drain current value increases non-linearly and the temperature of the TFT increases slightly. In FIG. 4, during the turn ON state of the TFT, wherein the TFT supplies a constant gate voltage (20V) to a gate, a drain current value linearly increases as the temperature increases. When the drain current flow exceeds a predetermined value, a pixel electrode connected to the TFT is turned ON. Accordingly, as the temperature of the TFT increases, the drain current increases, thereby turning ON the pixel electrode even though the applied gate voltage decreases at increased temperatures.

TFT-LCD devices for Car Navigation System (CNS) or for military equipment require wide operational temperature ranges for proper operation. Accordingly, since the current for turning ON/OFF the TFT increases as the temperature increases, information may, or may not be displayed by the TFT-LCD devices. One solution includes determining a capacitance of a storage capacitor of the pixel due to the operational temperature characteristics of the turn OFF current. Accordingly, since the LCD device has different driving characteristics according to changes in operational temperatures of the LCD device, a temperature sensor for sensing the temperature of the LCD panel is provided at an exterior portion of the LCD panel. However, providing the temperature sensor an the exterior of the LCD panel makes it difficult to sense the precise temperature of the LCD panel. In addition, since both the LCD panel and the temperature sensor are relatively expensive components, the temperature sensor is commonly produced inexpensively in order to reduce manufacturing costs.

SUMMARY OF THE INVENTION

Accordingly, the present invention is directed to an LCD device and a method of fabricating an LCD device that substantially obviates one or more problems due to limitations and disadvantages of the related art.

An object of the present invention is to provide an LCD device to measure an operational temperature of an LCD panel.

Another object of the present invention is to provide a method of fabricating an LCD device to measure an operational temperature of an LCD panel.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a liquid crystal display device includes a liquid crystal display panel having an effective area and a non-display area, and a temperature sense pattern provided within the non-display area of the liquid crystal display panel.

In another aspect, a liquid crystal display device includes a liquid crystal display panel having an image display area and a non-display area, and a temperature sense pattern provided within the non-display area of the liquid crystal display panel, the temperature sense pattern having a thin film transistor structure.

In another aspect, a method of fabricating a liquid crystal display device includes forming a temperature sense pattern provided within a non-display area of a liquid crystal display panel.

In another aspect, a method of fabricating a liquid crystal display device includes forming a temperature sense pattern provided within a non-display area of a liquid crystal display panel, the temperature sense pattern having a thin film transistor structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
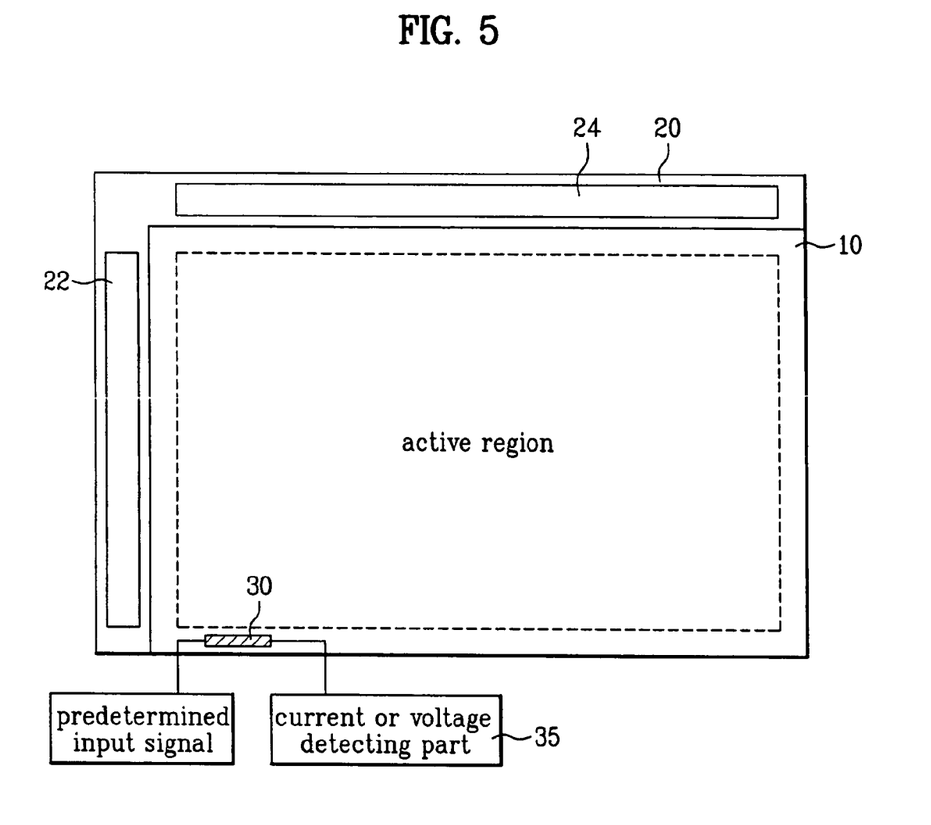
FIG. 5 is a plan view of an exemplary LCD device according to the present invention.

FIG. 5 is a plan view of an exemplary LCD device according to the present invention. In FIG. 5, an LCD device may include a temperature sense pattern 30 of a metal material within a non-display area of an LCD panel. The LCD device may include an upper substrate 10 having a color filter array, a lower substrate 20 having a TFT array, and a liquid crystal layer (not shown) between the upper and lower substrates 10 and 20. The lower substrate 20 may include portions for a gate driver 22 and a data driver 24, whereby a corresponding margin along a circumference of the lower substrate 20 may be provided. As a result, the lower substrate 20 may be larger than the upper substrate 10 according to the margin. Then, a sealant (not shown) may be formed along the circumference of a bonding portion (corresponding to the upper substrate area) for the upper and lower substrates 10 and 20. Next, the upper and lower substrates 10 and 20 may be bonded to each other with a cell gap therebetween. In FIG. 5, a dotted line portion inside the sealant may function as an active region for forming a pixel region.

In FIG. 5, the temperature sense pattern 30 may be formed within the non-display area of the LCD panel, and may be formed during a formation process of the gate and/or data lines. Accordingly, the temperature sense pattern 30 may be formed of the same material as that of the gate and/or data lines on the LCD panel. In addition, the temperature sense pattern 30 may be simultaneously formed of the same layer material(s) as that of the gate and/or data lines. For example, the gate and/or data lines and the temperature sense pattern 30 may be formed of at least one of chrome Cr, aluminum Al, tungsten W, tantalum Ta, copper Cu, and molybdenum Mo, or alloys thereof. Thus, an additional process for forming the temperature sense pattern 30 may not be required.

In addition, it may be possible to form the temperature sense pattern 30 by changing a corresponding mask pattern. When forming the gate and/or data lines with the same layer material, the temperature sense pattern 30 may be patterned by partially changing the mask of one of the corresponding gate and/or data lines. Selecting the desired same layer material may include consideration of material resistivity and temperature change linear coefficient of the material. For example, the material may be selected based upon increasing resistivity values due to corresponding temperature changes. Then, after obtaining the resistivity values corresponding to the current values, the temperature corresponding to the resistivity value may be measured. Table 1 shows resistivity values ($\rho_{20}$) of the various materials at a temperature of 20° C., and resistivity temperature coefficients ($\alpha$).

TABLE 1

| Resistivity ($\rho_{20}$) | Resistivity temperature coefficient ($\alpha$) | Material |
| --- | --- | --- |
| $1.62 \times 10^{-8}$ | $4.1 \times 10^{-3}$ | Silver (Ag) |
| $1.69 \times 10^{-8}$ | $4.3 \times 10^{-3}$ | Copper (Cu) |
| $2.75 \times 10^{-8}$ | $4.4 \times 10^{-3}$ | Aluminum (Al) |
| $9.68 \times 10^{-8}$ | $6.5 \times 10^{-3}$ | Iron (Fe) |

Accordingly, a first side of the temperature sense pattern 30 may be connected to a predetermined signal input part, and a second side of the temperature sense pattern 30 may be connected to a current or voltage detecting part 35. Thus, it may be possible to detect the current or voltage values at the second side of the temperature sense pattern 30 according to the signal input supplied to the first side of the temperature sense pattern 30. The temperature sense pattern 30 may function as a resistance source, wherein the resistivity may be changed by the temperature of the temperature sense pattern 30.

The LCD device may measure temperature using one of two methods. During a first method, when a predetermined DC voltage value is supplied to the first side of the temperature sense pattern 30, the current detecting part 35 may be connected to the second side of the temperature sense pattern 30, thereby producing a current value according to the temperature. Then, the resistance of the current detecting part 35 may be calculated as the outputted current value and the supplied DC voltage value. For example:

$R = V/I$ wherein "V" is the DC voltage value supplied to the temperature sense pattern, and "I" is the current value. By using characteristics of changes of the resistivity, the temperature may be sensed by measuring the resistivity. The relationship between the resistance and the resistivity may be:

$$R = \rho \frac{\lambda}{A},$$

and the relationship between the resistivity and the temperature may be:

$\rho = \rho_0(1 + \alpha \Delta T),$ wherein "$\rho$" is the resistivity of the temperature sense pattern, "$\lambda$" is the length of the temperature sense pattern, "A" is the area of the temperature sense pattern, "$\rho_0$" is the resistivity at the temperature of 0° C., "$\alpha$" is the resistivity temperature coefficient, and "$\Delta T$" is the temperature change.

Accordingly, the resistivity linearly increases according to the temperature change, and each material has the specific resistivity temperature coefficient. That is, if the type of material of the temperature sense pattern is known and the input/output values of the temperature sense pattern are known, it may be possible to sense the temperature change. The relationship between the temperature of the temperature sense pattern may be obtained with reference to the relationships between the resistance and resistivity and the resistivity and temperature, such as:

$$T = \frac{1}{\alpha}\left(\frac{1}{\rho_0}\frac{A}{\lambda}\frac{V}{I} - 1\right),$$

wherein "V" is the DC voltage supplied to the temperature sense pattern, "A" is an area of the temperature sense pattern, "$\lambda$" is a length of the temperature sense pattern, "I" is the produced current value, "$\alpha$" is a linear resistivity coefficient, and "$\rho_0$" is a resistivity of the temperature sense pattern at a temperature of 0° C. When calculating the temperature on the basis of the resistivity value, the current detecting part 35 may be connected to a controller (not shown) of the LCD panel, so that the controller of the LCD panel may calculate the temperature.

During a second method, when a predetermined DC voltage value is applied to a first side of the temperature sense pattern 30, the current detecting part 35 may be connected to a second side of the temperature sense pattern 30, thereby producing and sensing the voltage value according to the temperature state. In this case, after calculating the resistance of the temperature sense pattern 30 on the basis of the output voltage value and the supplied current value, the temperature change may be calculated according to a resistance value, such as $$R = V/I,$$

wherein "V" is the voltage value outputted from the temperature sense pattern, and "I" is the supplied current value.

Similar to the first temperature measure method, the second temperature measure method may include the current detecting part 35 provided at an output side of the temperature sense pattern 30 and connected to the controller (not shown) of the LCD panel so that the controller of the LCD panel may calculate the temperature. In order to predict the temperature change of the LCD panel, the temperature sense pattern 30 may be provided at an interior portion of the LCD panel. For example, the temperature sense pattern 30 may be provided within the non-display area outside the active region to prevent any interruption for displaying images.

According to the present invention, the temperature sense pattern 30 may be formed during a metal line formation process of the gate and/or data lines. For example, when patterning the metal lines on the lower substrate 20, the temperature sense pattern 30 may be formed as a dummy pattern within the non-display area of the lower substrate 20. Accordingly, by using the linear relationship between resistance characteristics of the metal and temperature, the temperature sense pattern may detect the resistance value of the dummy pattern from a controller of the LCD panel, and then may measure the temperature corresponding to the detected resistance value. Thus, the metal material(s) may have different resistivity values, wherein the resistivity may be a unique characteristic of the metal material(s). When using a single metal material, it may be possible to obtain the resistivity of the corresponding metal by sensing the resistance change according to the temperature change, whereby it may be used as information for deciding the kind of metal to be used. At this time, the temperature sense pattern 30 may have a predetermined length "λ" and a predetermined area "A" in order to measure the resistivity "ρ."

Although the temperature sense pattern 30 is shown to have a rectangular shape, it may be formed having various shapes. Accordingly, the temperature sense pattern 30 may be provided with the LCD device such that the components of the lower substrate 20 may have changeable driving characteristics according to temperature sensitivity of the liquid crystal material of the LCD panel. Thus, the controller of the LCD panel connected to the current or voltage detecting part 35 may measure the temperature through the temperature sense pattern 30, and may perform a temperature compensation when detecting an unacceptable temperature state. For example, when the temperature of the LCD panel is unacceptably low or high, it may be possible to compensate for the temperature of the LCD panel by using a heating or cooling system.

Figure 6:
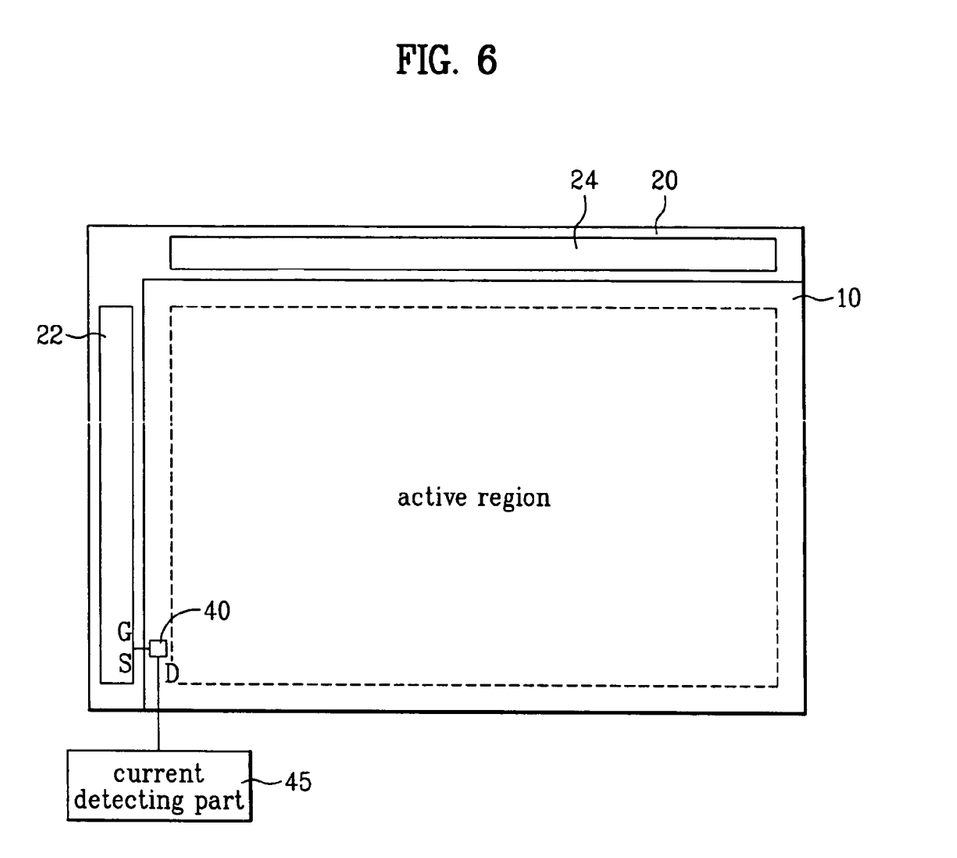
FIG. 6 is a plan view of another exemplary LCD device according to the present invention.
Figure 7:
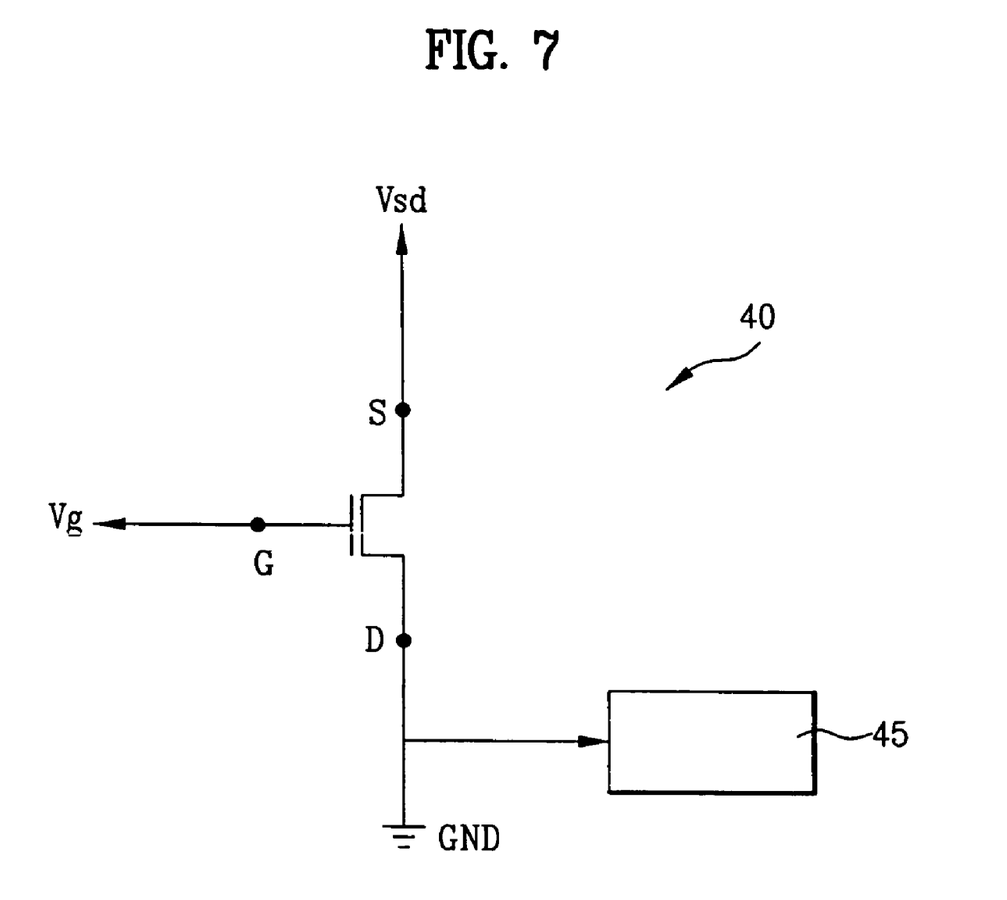
FIG. 7 is a schematic circuit diagram of an exemplary temperature sense pattern of FIG. 6 according to the present invention.

FIG. 6 is a plan view of another exemplary LCD device according to the present invention, and FIG. 7 is a schematic circuit diagram of an exemplary temperature sense pattern of FIG. 6 according to the present invention. In FIG. 6, an LCD device may include a temperature sense pattern 40 of a TFT-type structure within a non-display area of an LCD panel.

In FIG. 7, the temperature sense pattern 40 may be provided between a source terminal S having a source voltage Vsd and a grounding drain terminal D. Accordingly, the temperature sense pattern 40 may be controlled by application of a gate voltage Vg to a gate terminal G. Then, the temperature sense pattern 40 may be connected to a current detecting part 45 controlled by a controller (not shown) of the LCD panel to sense a drain current Id flowing through the drain terminal D when supplying input voltage signals Vsd and Vg.

Similar to the LCD device of FIG. 5, the LCD device of FIG. 6 may include an upper substrate 10 having a color filter array, a lower substrate 20 having a TFT array, and a liquid crystal layer (not shown) between the upper and lower substrates 10 and 20. The lower substrate 20 may include portions for a gate driver 22 and a data driver 24, wherein it may be necessary to provide a margin along a circumference of the lower substrate 20. As a result, the lower substrate 20 may be larger than the upper substrate 10 due to the margin.

Then, a sealant (not shown) may be formed along the circumference of a bonding portion (corresponding to the upper substrate area) for the upper and lower substrates 10 and 20, and the upper and lower substrates 10 and 20 may be bonded to each other with a cell gap therebetween. In FIG. 6, a dotted line portion within the sealant may function as an active region for forming a pixel region, and a portion exterior to the active region may function as a non-display area of the LCD panel.

In FIG. 6, a temperature sense pattern 40 may be provided within the non-display area of the LCD panel, and may be formed during the process for forming the TFT. Accordingly, additional processes for forming the temperature sense pattern 40 may not be necessary. For example, the temperature sense pattern 40 may be simultaneously formed during the process for forming a gate line, a semiconductor layer, and a data line of the TFT. Thus, it may be possible to form the temperature sense pattern 40 by changing a corresponding mask pattern used for forming the lower substrate 20.

The input voltage signals Vsd and Vg may be supplied from the gate driver 22 and the source driver 24 to the gate terminal G and the source terminal S of the temperature sense pattern 40. In addition, the same voltage signal (Vg=Vsd) may be supplied to the gate terminal G and the source terminal S from the gate driver 22. Accordingly, the temperature sense pattern 40 may be provided for measuring a temperature change due to the drain current Id output by the input voltage signals Vg and Vsd. Thus, the temperature sense pattern 40 may be maintained in a continuously ON state by supplying the gate voltage Vg and the source voltage Vsd within specific values to sense the drain current Id, thereby measuring the temperature changes of the LCD panel.

The gate voltage Vg and the source voltage Vsd may be supplied through the gate driver 22 and the source driver 24, respectively. Accordingly, it may be difficult to process the line connection between the temperature sense pattern 40 and the corresponding driver 22 and 24 to supply additional signals. Thus, as shown in FIG. 6, it is preferable to connect the temperature sense pattern 40 with the gate driver 22 or the data driver 24 by a single conductive line.

Figure 8:
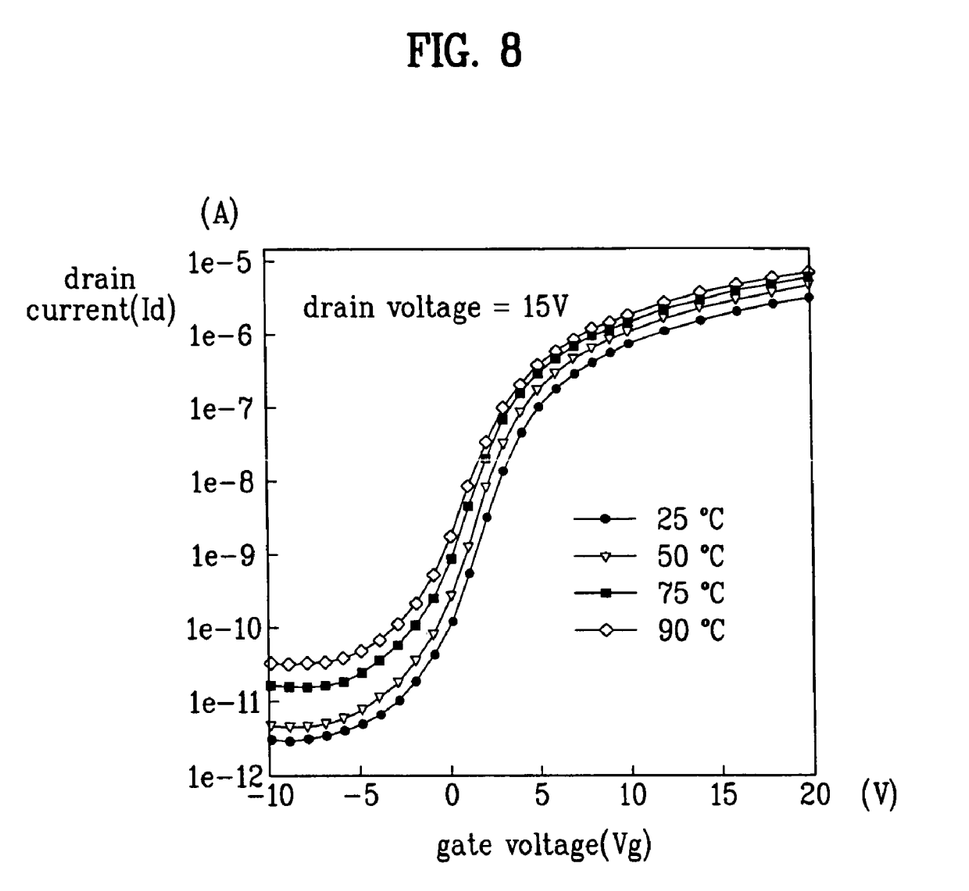
FIG. 8 is a graph showing a relationship between gate voltage and drain current of a TFT due to temperature change of the transistor of FIG. 7 according to the present invention.

FIG. 8 is a graph showing a relationship between gate voltage and drain current of a TFT due to temperature change of the transistor of FIG. 7 according to the present invention. In FIG. 8, the output of the drain current Id may be shifted by the temperature change for supplying the gate voltage Vg of the transistor, which comprises gate G, source S, and drain D. Accordingly, when the voltage supplied to the drain terminal of the transistor remains constant at 15V, the gate voltage-drain current curve at the corresponding temperatures of 25° C., 50° C., 75° C., and 90° C. Thus, as the temperature increases from a low state to a high state, the gate voltage-drain current curve may shift upwardly.

In FIG. 7, after supplying the gate voltage Vg and the source voltage Vsd at 15V, the drain current Id may be measured to determine the corresponding temperature. In addition, the current detecting part 45 may be connected to a controller of the LCD panel, whereby the controller of the LCD panel may measure the temperature corresponding to the drain current, and may perform temperature compensation. For example, if the controller of the LCD panel connected to the current detecting part 45 through the temperature sense pattern 40 detects an unacceptable temperature of the LCD panel, the controller may perform the temperature compensation. Thus, if the temperature of the LCD panel is unacceptably low or high, it may be possible to compensate for the temperature of the LCD panel by using a heating system or a cooling system.

According to the present invention, a temperature sense pattern may be provided as a dummy metal pattern, or may be provided as a TFT-type structure. In addition, the temperature sense patterns may be provided at an interior of the LCD panel, whereby the temperature sense patterns may be formed during the process of forming the lower substrate. As a result, it may be possible to form the temperature sense patterns using simplified processing and at lower production costs.

According to the present invention, a temperature sense pattern may be additionally provided at an interior of the LCD panel, whereby additional component at an exterior of an LCD panel to measure the temperature thereof may not be necessary. In addition, by using a material having a linear resistivity change characteristics according to temperature, it may be possible to measure the precise temperature change of the LCD panel. Furthermore, it may be possible to form a temperature sense pattern by changing a corresponding mask pattern without any additional processes.

It will be apparent to those skilled in the art that various modifications and variations can be made in the liquid crystal display device and method of fabricating the same of the present invention without departing from the spirit of scope of the claims. Thus, it is intended that the present invention cover the modifications and variations of this invention provided they come within the scope of the appended claims and their equivalents.

What is claimed is:

1. A liquid crystal display device, comprising:
a liquid crystal display panel having an effective area and a non-display area; and
a temperature sense pattern provided, within the non-display area of the liquid crystal display panel, wherein the temperature sense pattern is connected to a current detection system wherein a first side of the temperature sense pattern receives a DC (Direct Current) constant voltage from an external source, and a second side of the temperature sense pattern produces a current value, wherein the current detection system is connected to a controller of the liquid crystal display panel,
wherein the controller measures a temperature corresponding to the current value produced by the current detection system having a relationship of:

$$T = \frac{1}{\alpha}\left(\frac{1}{\rho_0}\frac{A}{l}\frac{V}{I} - 1\right),$$

wherein "V" is the DC constant voltage supplied to the temperature sense pattern, "A" is an area of the temperature sense pattern, "l" is a length of the temperature sense pattern, "I" is the produced current value, "α" is a linear resistivity coefficient, and "$\rho_0$" is a resistivity of the temperature sense pattern at a temperature of 0° C.

2. The device according to claim 1, wherein the liquid crystal display panel includes a plurality of gate lines and data lines, and the temperature sense pattern is formed of the same material as one of the gate lines and the data lines.

3. The device according to claim 2, wherein the temperature sense pattern is formed on a same layer as one of the gate lines and the data lines.

4. The device according to claim 2, wherein the temperature sense pattern includes at least one of chrome Cr, aluminum Al, tungsten W, tantalum Ta, copper Cu, molybdenum Mo, and an alloy thereof.

5. A liquid crystal display device, comprising:
a liquid crystal display panel having an effective area and a non-display area; and
a temperature sense pattern provided within the non-display area of the liquid crystal display panel, wherein the temperature sense pattern is connected to a voltage detection system wherein a first side of the temperature sense pattern receives a DC (Direct Current) constant current from an external source, and a second side of the temperature sense pattern produces a voltage value, wherein the voltage detection system is connected to a controller of the liquid crystal display panel,
wherein the controller measures a temperature corresponding to the voltage value produced by the voltage detection system having a relationship of:

$$T = \frac{1}{\alpha}\left(\frac{1}{\rho_0}\frac{A}{l}\frac{V}{I} - 1\right),$$

wherein "I" is the DC constant current supplied to the temperature sense pattern, "A" is an area of the temperature sense pattern, "l" is a length of the temperature sense pattern, "α" is a linear resistivity coefficient, "V" is a produced voltage value and "$\rho_0$" is a resistivity of the temperature sense pattern at a temperature of 0° C.

6. A liquid crystal display device, comprising:
a liquid crystal display panel having an image display area and a non-display area; and
a temperature sense pattern provided within the non-display area of the liquid crystal display panel, the temperature sense pattern having a thin film transistor structure, wherein the temperature sense pattern is formed during a same process of forming a thin film transistor within an image display area of the liquid crystal display panel,
wherein the temperature sense pattern includes gate and source terminals that receive signals from a gate driver and a data driver of the liquid crystal display panel, respectively.

7. The device according to claim 6, wherein an output of a drain current is shifted by a temperature change by application of a gate voltage to the gate terminal.

8. The device according to claim 6, wherein the temperature sense pattern is connected to a current detection system that receives a DC voltage value from an external source, and produces a current value.

9. The device according to claim 8, wherein the current detection system is connected to a controller of the liquid crystal display panel.

10. The device according to claim 9, wherein the controller senses a temperature corresponding to the current value produced from the current detection system.

11. A method of fabricating a liquid crystal display device, comprising:
forming a temperature sense pattern provided within a non-display area of a liquid crystal display panel, wherein the temperature sense pattern is connected to a current detection system wherein a first side of the temperature sense pattern receives a DC (Direct Current) constant voltage from an external source, and a second side of the temperature sense pattern produces a current value, wherein the current detection system is connected to a controller of the liquid crystal display panel,
wherein the controller measures a temperature corresponding to the current value produced by the current detection system having a relationship of:

$$T = \frac{1}{\alpha}\left(\frac{1}{\rho_0}\frac{A}{l}\frac{V}{I} - 1\right),$$

wherein "V" is the DC constant voltage supplied to the temperature sense pattern, "A" is an area of the temperature sense pattern, "l" is a length of the temperature sense pattern, "I" is the produced current value, "α" is a linear resistivity coefficient, and "$\rho_0$" is a resistivity of the temperature sense pattern at a temperature of 0° C.

12. The method according to claim 11, wherein the liquid crystal display panel includes a plurality of gate lines and data lines, and the temperature sense pattern is formed of the same material as one of the gate lines and the data lines.

13. The method according to claim 12, wherein the temperature sense pattern is formed on a same layer as one of the gate lines and the data lines.

14. The method according to claim 11, wherein the temperature sense pattern includes at least one of chrome Cr, aluminum Al, tungsten W, tantalum Ta, copper Cu, molybdenum Mo, and an alloy thereof.

15. A method of fabricating a liquid crystal display device, comprising:
forming a temperature sense pattern provided within a non-display area of a liquid crystal display panel,
wherein the temperature sense pattern is connected to a voltage detection system wherein a first side of the temperature sense pattern receives a DC (Direct Current) constant current from an external source, and a second side of the temperature sense pattern produces a voltage value, wherein the voltage detection system is connected to a controller of the liquid crystal display panel,
wherein the controller measures a temperature corresponding to the voltage value produced by the voltage detection system having a relationship of:

$$T = \frac{1}{\alpha}\left(\frac{1}{\rho_0}\frac{A}{l}\frac{V}{I} - 1\right),$$

wherein "I" is the DC constant current supplied to the temperature sense pattern, "A" is an area of the temperature sense pattern, "l" is a length of the temperature sense pattern, "V" is the produced voltage value, "α" is a linear resistivity coefficient, and "$\rho_0$" is a resistivity of the temperature sense pattern at a temperature of 0° C.

16. A method of fabricating a liquid crystal display device, comprising:
forming a temperature sense pattern within a non-display area of a liquid crystal display panel, the temperature sense pattern having a thin film transistor structure during a same process of forming a thin film transistor within an image display area of the liquid crystal display panel,
wherein the temperature sense pattern includes gate and source terminals that receive signals from a gate driver and a data driver of the liquid crystal display panel, respectively.

17. The method according to claim 16, wherein an output of a drain current is shifted by a temperature change by application of a gate voltage to the gate terminal.

18. The method according to claim 16, further comprising connecting the temperature sense pattern to a current detection system that receives a DC voltage value from an external source, and produces a current value.

19. The method according to claim 18, further comprising connecting the current detection system to a controller of the LCD panel.

20. The method according to claim 19, wherein the controller senses a temperature corresponding to the current value produced from the current detection system.

* * * * *